(12) United States Patent
Nishimura

(10) Patent No.: US 6,407,476 B1
(45) Date of Patent: Jun. 18, 2002

(54) A.C. GENERATOR FOR USE IN A VEHICLE

(75) Inventor: Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 12 days.

(21) Appl. No.: 09/711,093

(22) Filed: Nov. 14, 2000

(30) Foreign Application Priority Data

May 12, 2000 (JP) ........................................ 2000-139930

(51) Int. Cl.[7] .............................................. H02K 11/00
(52) U.S. Cl. ..................... 310/180; 310/68 D; 310/184; 322/90
(58) Field of Search ................................ 310/179, 180, 310/184, 188, 189, 201, 68 D; 322/46, 89, 90, 20

(56) References Cited

U.S. PATENT DOCUMENTS

| | | | | |
|---|---|---|---|---|
| 4,808,866 A | * | 2/1989 | Kawazoe | 310/68 |
| 5,455,500 A | * | 10/1995 | Shichijyo | 322/90 |
| 5,982,068 A | * | 11/1999 | Umeda | 310/206 |
| 5,986,375 A | * | 11/1999 | Umeda | 310/180 |
| 6,121,707 A | * | 9/2000 | Bell | 310/179 |
| 6,181,044 B1 | * | 1/2001 | Umeda | 310/201 |
| 6,201,332 B1 | * | 3/2001 | Umeda | 310/184 |
| 6,204,586 B1 | * | 3/2001 | Umeda | 310/179 |
| 6,211,594 B1 | * | 4/2001 | Umeda | 310/180 |
| 6,281,609 B1 | * | 8/2001 | Itami | 310/68 B |
| 6,281,612 B1 | * | 8/2001 | Asao | 310/179 |
| 6,331,760 B1 | * | 12/2001 | McLane, Jr. | 318/767 |

FOREIGN PATENT DOCUMENTS

JP      58-218873      12/1983

* cited by examiner

*Primary Examiner*—Nestor Ramirez
*Assistant Examiner*—Iraj Mohandesi
(74) *Attorney, Agent, or Firm*—Sughrue Mion, PLLC

(57) ABSTRACT

An a.c. generator for a vehicle includes: a rotor rotatably supported within a case; and a stator having a cylindrical stator core in which a plurality of slots are formed at given intervals circumferentially so as to open toward the inner peripheral side thereof and a stator winding constructed by connecting three single-phase windings wound on the stator core into Y connection, the stator being fitted onto the case so as to surround the rotor, wherein each of the single-phase windings comprises a first winding which is connected into the Y connection and a second winding which is connected in series to the first winding and has a given phase difference in electrical angle with respect to the first winding, and wherein a connecting portion of the first winding and the second winding constituting each of the single-phase windings is connected to a pair of three-phase diode bridges, and an end portion of the second winding constituting each of the single-phase windings is connected to another pair of three-phase diode bridges.

10 Claims, 4 Drawing Sheets

A.C. GENERATOR FOR USE IN A VEHICLE

BACKGROUND OF THE INVENTION

1. Field of the Invention

The present invention relates to an a.c. generator for a vehicle, and more particularly to the structure of a stator winding wound on a stator in an a.c. generator for a vehicle.

2. Description of the Related Art

FIG. 5 is a cross-sectional view showing a general a.c. generator for a vehicle.

Referring to FIG. 5, the a.c. generator for a vehicle is structured by rotatably mounting a Lundell-type rotor 7 inside a case 3 constructed from an aluminum front bracket 1 and an aluminum rear bracket 2 by means of a shaft 6, and fastening a stator 8 to an inner wall of the case 3 so as to cover an outer peripheral side of the rotor 7.

The shaft 6 is rotatably supported by the front bracket 1 and the rear bracket 2. A pulley 4 is fastened to one end of the shaft 6 so that the rotating torque of an engine can be transmitted to a shaft 6 by means of a belt (not shown). Slip rings 9 for supplying a current to the rotor 7 are fastened to the other end portion of the shaft 6, and a pair of brushes 10 are housed in a brush holder 11 disposed within the case 3 such that the pair of brushes 10 slide in contact with the slip rings 9. A regulator 18 for adjusting the magnitude of an a.c. voltage generated in the stator 8 is fastened by adhesive to a heat sink 17 fitted onto the brush holder 11. A rectifier 12 which is electrically connected to the stator 8 and rectifies the a.c. voltage generated in the stator 8 into a d.c. voltage is mounted within the case 3.

The rotor 7 is composed of a rotor winding 13 for generating magnetic flux on passage of electric current, and a pair of pole cores 20 and 21 disposed so as to cover the rotor winding 13, magnetic poles being formed in the pole cores 20 and 21 by magnetic flux generated in the rotor winding 13. The pair of pole cores 20 and 21 are made of iron, each has six claw-shaped magnetic poles 22 and 23 disposed on an outer circumferential perimeter at even pitch in a circumferential direction so as to project axially, and the pole cores 20 and 21 fastened to the shaft 6 facing each other such that the claw-shaped magnetic poles 22 and 23 intermeshed. In addition, fans 5 are fastened to both ends of the rotor 7 in the axial direction thereof.

The stator 8 is composed of a cylindrical stator core 15 having a plurality of slots extending axially at a predetermined pitch in a circumferential direction, and a stator winding 16 wound on the stator core 15.

In the a.c. generator for a vehicle thus structured, a current is supplied to the rotor winding 13 from a battery (not shown) through the brushes 10 and the slip rings 9, to thereby generate magnetic flux. The claw-shaped magnetic poles 22 of the pole core 20 are magnetized with north-seeking (N) poles by this magnetic flux, and the claw-shaped magnetic poles 23 of the pole core 21 are magnetized with south-seeking (S) poles. At the same time, rotating torque from the engine is transmitted through the belt and the pulley 4 to the shaft 6, rotating the rotor 7. Thus, a rotating magnetic field is applied to the stator winding 16, generating electromotive force in the stator winding 16. This a.c. electromotive force passes through the rectifier 12 and is converted into a d.c. electromotive force, the magnitude of the electromotive force is adjusted by the regulator 12 and the battery is recharged.

Now, the structure of the stator winding 16 will be described with reference to FIG. 6. In this example, the number of magnetic poles of the rotor 7 is 12. In FIG. 6, reference numerals 1 to 36 denote slot Nos.

The stator core 15 is formed of a cylindrical magnetic material in which 36 slots 15a are formed at a predetermined pitch in a circumferential direction so as to open toward the inner peripheral side thereof.

A winding 30 is formed by wave winding a conductor 29 into every three slots 15a such that the order of slots into which the conductor 29 is inserted is slot number 1, 4, 7, . . . ,34. A winding 31 is formed by wave winding a conductor 29 into every three slots 15a such that the order of slots into which the conductor 29 is inserted is slot number 3, 6, 9, . . . ,36. A winding 32 is formed by wave winding a conductor 29 into every three slots 15a such that the order of slots into which the conductor 29 is inserted is slot number 5, 8, 11, . . . ,2.

Those three windings 30, 31 and 32 thus formed is connected their winding end portions 30b, 31b and 32b together, that is, is connected into Y connection to structure the stator winding 16. The connecting portion of the winding end portions 30b, 31b and 32b becomes a neutral point of the stator winding 16, and winding start portions 30a, 31a and 32a become lead wires of the stator winding 16. Those three windings 30, 31 and 32 are different in electrical angle by 120° phase.

The rectifier 12 is structured in such a manner that a plus side diode $d_{11}$ and a minus side diode $d_{21}$ which are connected in series, a plus side diode $d_{12}$ and a minus side diode $d_{22}$ which are connected in series, a plus side diode $d_{13}$ and a minus side diode $d_{23}$ which are connected in series, and a plus side diode $d_{14}$ and a minus side diode $d_{24}$ which are connected in series are connected in parallel between an output terminal B and the ground. Also, as shown in FIG. 7, the stator winding 16 is connected to the rectifier 12 in such a manner that the winding start portion 30a of the winding 30 is connected between the plus side diode $d_{11}$ and the minus side diode $d_{21}$ which are connected in series, the winding start portion 31a of the winding 31 is connected between the plus side diode $d_{12}$ and the minus side diode $d_{22}$ which are connected in series, the winding start portion 32a of the winding 32 is connected between the plus side diode $d_{13}$ and the minus side diode $d_{23}$ which are connected in series, and the neutral point is connected between the plus side diode $d_{14}$ and the minus side diode $d_{24}$ which are connected in series, respectively.

In the a.c. generator for a vehicle thus structured, if the rotating speed is low, a voltage of $3_{1/2}$ times of a single-phase induced voltage is developed between the wires. Also, if the rotating speed is high, although main magnetic flux is weakened by a three-phase a.c. current that flows in three single-phase windings 30, 31 and 32, since a tertiary higher harmonic electromotive force remains, this generator is employed with the diode connected to the neutral point.

In the conventional a.c. generator for a vehicle, since the stator winding 16 is structured by connecting the three single-phase windings 30, 31 and 32 different in electrical angle by 120° phase into Y connection, only the voltage of $3_{1/2}$ times of the single-phase induced voltage is developed between the wires, resulting in such a problem that the conventional a.c. generator could not satisfy a demand for generation when the rotating speed is low.

In order to solve the above drawback, there is proposed that the number of turns of the windings 30, 31 and 32 in the respective phases is increased. However, in this case, there arises such a problem that a generation current decreases when the rotating speed is high.

SUMMARY OP THE INVENTION

The present invention has been made in order to solve the above problems with the conventional generators, and therefore an object of the present invention is to provide an a.c. generator for a vehicle with an improved stator winding which is capable of making a voltage developed between the wires large and making a generation current at a higher rotating speed large.

In order to achieve one aspect of the above object, according to one aspect of the present invention, there is provided an a.c. generator for a vehicle, including:

a rotor rotatably supported within a case; and a stator having a cylindrical stator core in which a plurality of slots are formed at given intervals circumferentially so as to open toward the inner peripheral side thereof and a stator winding constructed by connecting three single-phase windings wound on the stator core into Y connection, the stator being fitted onto the case so as to surround the rotor, wherein each of the single-phase windings includes a first winding which is connected into the Y connection and a second winding which is connected in series to the first winding and has a given phase difference in electrical angle with respect to the first winding, and wherein a connecting portion of the first winding and the second winding constituting each of the single-phase windings is connected to a pair of three-phase diode bridges, and an end portion of the second winding constituting each of the single-phase windings is connected to another pair of three-phase diode bridges.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
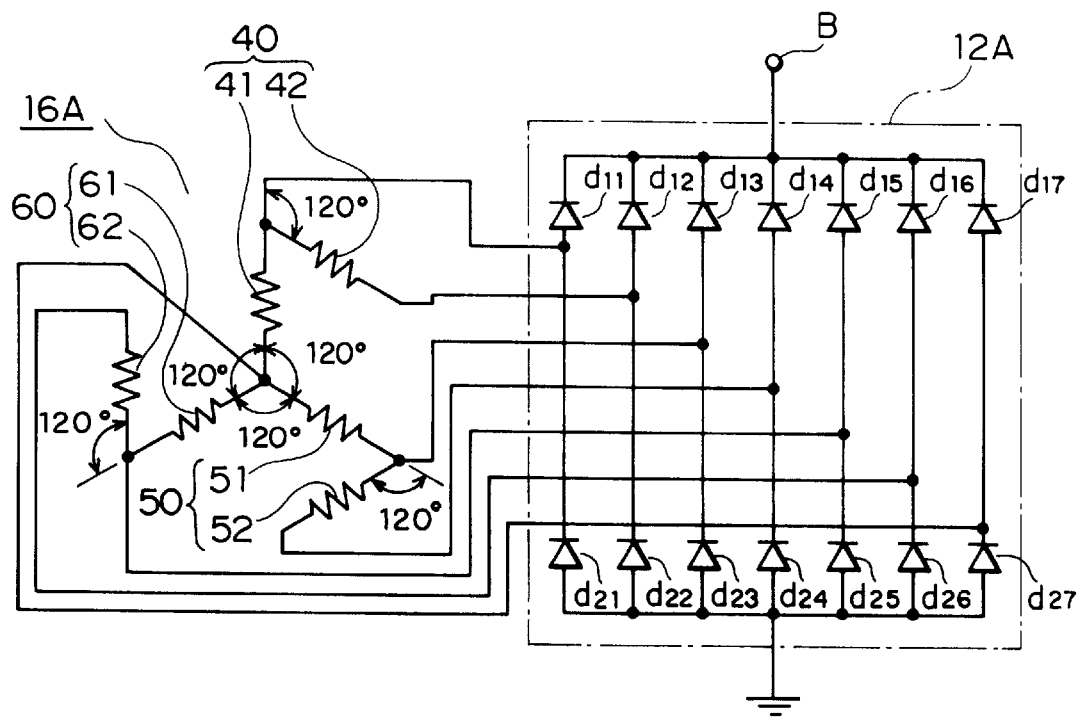
FIG. 1 is a diagram showing an electric connection of a stator winding in an a.c. generator for a vehicle in accordance with a first embodiment of the present invention.
Figure 2:
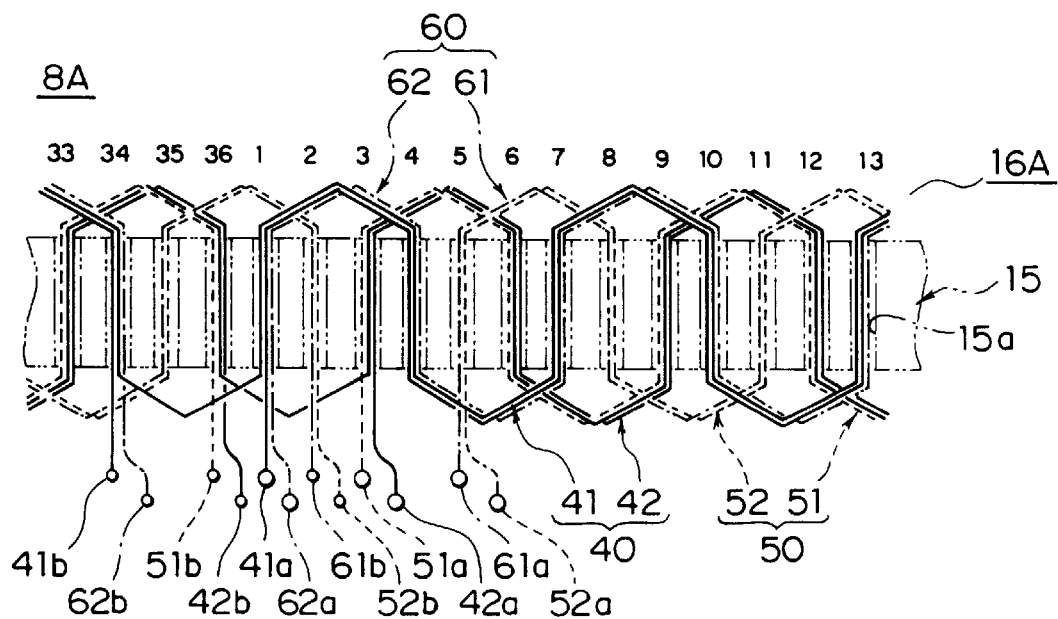
FIG. 2 is a development diagram for explanation of the structure of the stator winding in a stator in the a.c. generator for a vehicle in accordance with the first embodiment of the present invention.

FIG. 1 is a diagram showing an electric connection of a stator winding in an a.c. generator for a vehicle in accordance with a first embodiment of the present invention. FIG. 2 is a development diagram for explanation of the structure of the stator winding in a stator of the a.c. generator for a vehicle in accordance with the first embodiment of the present invention.

Referring to FIG. 1, a stator winding 16A is structured by connecting three single-phase windings 40, 50 and 60 having a phase difference of 120° in electrical angle into Y connection. The winding 40 is structured by connecting first and second windings 41 and 42 having a phase difference of 120° in electrical angle in series. Also, the winding 50 is structured by connecting first and second windings 51 and 52 having a phase difference of 120° in electrical angle in series. Further, the winding 60 is structured by connecting first and second windings 61 and 62 having a phase difference of 120° in electrical angle in series.

In this example, those three single-phase windings 40, 50 and 60 are formed of the same conductors and have the same number of turns. Also, the first winding 41, 51 and 61 are identical in the number of turns with the second windings 42, 52 and 62.

A rectifier 12A is structured in such a manner that a plus side diode $d_{11}$ and a minus side diode $d_{21}$ which are connected in series, a plus side diode $d_{12}$ and a minus side diode $d_{22}$ which are connected in series, a plus side diode $d_{13}$ and a minus side diode $d_{23}$ which are connected in series, a plus side diode $d_{14}$ and a minus side diode $d_{24}$ which are connected in series, a plus side diode $d_{15}$ and a minus side diode $d_{25}$ which are connected in series, a plus side diode $d_{16}$ and a minus side diode $d_{26}$ which are connected in series, and a plus side diode $d_{17}$ and a minus side diode $d_{27}$ which are connected in series are connected in parallel between an output terminal B and the ground.

Also, a stator winding 16A is connected to the rectifier 12A in such a manner that a connecting portion of the first winding 41 and the second winding 42 of the winding 40 is connected between the plus side diode $d_{11}$ and the minus side diode $d_{21}$ which are connected in series, an end portion of the second winding 42 of the winding 40 is connected between the plus side diode $d_{12}$ and the minus side diode $d_{22}$ which are connected in series, a connecting portion of the first winding 51 and the second winding 52 of the winding 50 is connected between the plus side diode $d_{13}$ and the minus side diode $d_{23}$ which are connected in series, an end portion of the second winding 52 of the winding 50 is connected between the plus side diode $d_{14}$ and the minus side diode $d_{24}$ which are connected in series, a connecting portion of the first winding 61 and the second winding 62 of the winding 60 is connected between the plus side diode $d_{15}$ and the minus side diode $d_{25}$ which are connected in series, an end portion of the second winding 62 of the winding 60 is connected between the plus side diode $d_{16}$ and the minus side diode $d_{26}$ which are connected in series, and the neutral point is connected between the plus side diode $d_{17}$ and the minus side diode $d_{27}$ which are connected in series, respectively.

That is, in the electric connection according to the first embodiment, the output ends of the first windings 41, 51 and 61 which are connected into the Y connection are connected with a three-phase diode bridge, the output ends of the second windings 42, 52 and 62 which are connected in series to the first windings 41, 51 and 61 so as to provide a phase difference of 120° in electrical angle are connected with a three-phase diode bridge, and the neutral point is connected with a diode bridge.

Now, a specific winding structure of the windings 40, 50 and 60 in each phase will be described with reference to FIG. 2. In FIG. 2, reference numerals 1 to 36 denote slot Nos.

The first winding 41 that structures the winding 40 is formed by wave winding a conductor 29 into every three slots 15*a* such that the order of slots into which the conductor 29 is inserted is slot number 1, 4, 7, . . . , 34. On the other hand, the second winding 42 is formed by wave winding a conductor 29 into every three slots 15*a* such that the order of slots into which the conductor 29 is inserted is slot number 3, 6, 9, . . . , 36. The first winding 41 and the second winding 42 have a phase difference of 120° in electrical angle therebetween since the wound slots 15*a* are shifted by three slots. Then, the winding 40 is structured such that the winding start portion 41*a* of the first winding 41 and the winding end portion 42*b* of the second winding 42 are connected to each other so that the first winding 41 and the second winding 42 are connected in series to provide a phase difference of 120° in electrical angle.

The first winding 51 that structures the winding 50 is formed by wave winding a conductor 29 into every three slots 15*a* such that the order of slots into which the conductor 29 is inserted is slot number 3, 6, 9, . . . , 36. On the other hand, the second winding 52 is formed by wave winding a conductor 29 into every three slots 15*a* such that the order of slots into which the conductor 29 is inserted is slot number 5, 8, 11, . . . , 2. The first winding 51 and the second winding 52 have a phase difference of 120° in electrical angle therebetween since the wound slots 15*a* are shifted by three slots. Then, the winding 50 is structured such that the winding start portion 51*a* of the first winding 51 and the winding end portion 52*b* of the second winding 52 are connected to each other so that the first winding 51 and the second winding 52 are connected in series to provide a phase difference of 120° in electrical angle.

The first winding 61 that structures the winding 60 is formed by wave winding a conductor 29 into every three slots 15*a* such that the order of slots into which the conductor 29 is inserted is slot number 5, 8, 11, . . . , 2. On the other hand, the second winding 62 is formed by wave winding a conductor 29 into every three slots 15*a* such that the order of slots into which the conductor 29 is inserted is slot number 1, 4, 7, . . . , 34. The first winding 61 and the second winding 62 have a phase difference of 120° in electrical angle therebetween since the wound slots 15*a* are shifted by three slots. Then, the winding 60 is structured such that the winding start portion 61*a* of the first winding 61 and the winding end portion 62*b* of the second winding 62 are connected to each other so that the first winding 61 and the second winding 62 are connected in series to provide a phase difference of 120° in electrical angle.

Then, the winding end portion 41*b* of the first winding 41, the winding end portion 51*b* of the first winding 51 and the winding end portion 61*b* of the first winding 61 are connected to each other to obtain a stator 8A on which the stator winding 16A formed by connecting the three single-phase windings 40, 50 and 60 having a phase difference of 120° in electrical angle into the Y connection is wound.

In the stator 8A thus structured, the three single-phase windings 40, 50 and 60 which are connected into the Y connection are structured by connecting the first windings 41, 51 and 61 and the second windings 42, 52 and 62 each having a phase difference of 120° in electrical angle in series, the connecting portions of the first windings 41, 51 and 61 and the second windings 42, 52 and 62 are connected to the three-phase diode bridge, and the end portions of the second windings 42, 52 and 62 are connected to the three-phase diode bridge. Therefore, the maximum voltage developed between the wires is a voltage twice as large as a single-phase induced voltage. As a result, since a no-load electromotive force becomes large, the generation start rotating speed can be lowered so that a demand for generation when the rotating speed is low is satisfied.

Also, when the rotating speed is high, since a current flows in the second windings 42, 52 and 62, an armature reaction is small, a large current flows in the second windings 42, 52 and 62, to thereby increase the amount of generation.

Also, from the viewpoint of a current path, for example, a current that flows in the connecting portion of the first winding 61 and the second winding 62 takes current paths of (−)→the first winding 61→the first winding 41→the second winding 42→B, (−)→the first winding 61→the first winding 41→B, and (−)→the second winding 62→B. Therefore, the number of the current paths is large so that the amount of generation can increase.

Also, since the diode bridge is connected to the neutral point, three parallel circuits consisting of (−)→the neutral point→the first winding 41→B, (−)→the neutral point→the first winding 51→B, and (−)→the neutral point→the first winding 61→B are formed, those parallel circuits act as if serial and parallel connections are changed over, thereby being capable of increasing an output current.

Figure 3:
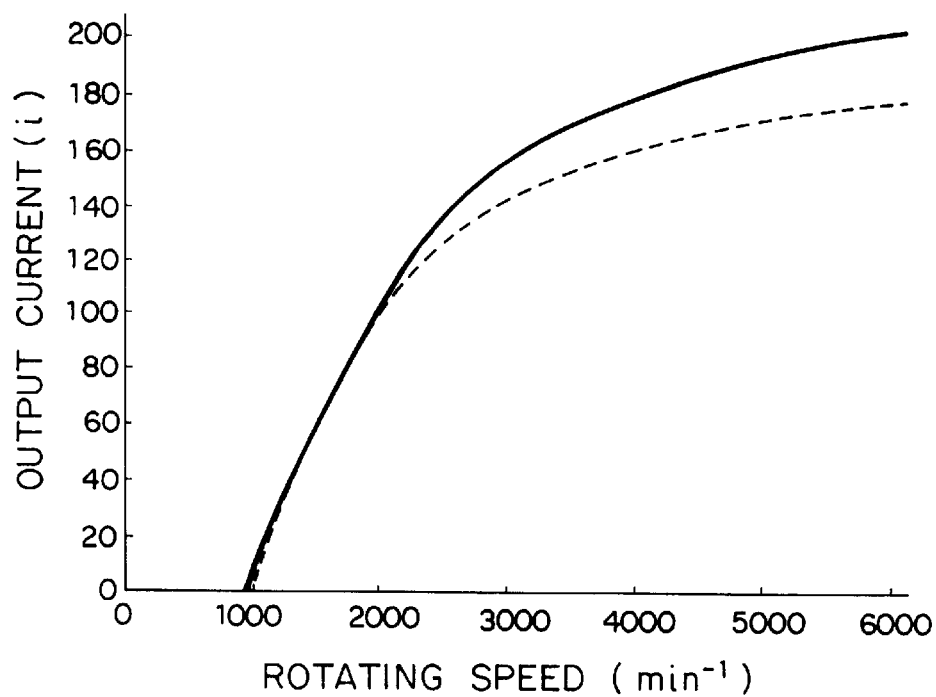
FIG. 3 is a graph showing the generating characteristic of the a.c. generator for a vehicle in accordance with the first embodiment of the present invention.

A result of measuring the generating characteristic after manufacturing an a.c. generator for a vehicle on which the stator 8A is mounted instead of the stator 8 is shown in FIG. 3. In FIG. 3, the generating characteristic of the a.c. generator for a vehicle according to the present invention is indicated by a solid line whereas the generating characteristic of the conventional a.c. generator for a vehicle is indicated by a dotted line. Also, the axis of abscissa represents a rotating speed whereas the axis of ordinate represents an output current after rectification.

It has been recognized from FIG. 3 that the generation start rotating speed is 1000 (min$^{-1}$) in the conventional a.c. generator for a vehicle whereas the generation start rotating speed is 900 (min$^{-1}$) in the a.c. generator for a vehicle according to the present invention, that is, generation is enabled at a lower rotating speed.

Also, it has been recognized that the a.c. generator for a vehicle according to the present invention can increase an output at the rotating speed of 2000 min$^{-1}$ or higher as compared with the conventional a.c. generator for a vehicle.

Second Embodiment

In a second embodiment, the three single-phase windings 40, 50 and 60 are formed of the same conductors and have the same number of turns. Also, the number of turns of the second windings 42, 52 and 62 are larger than the number of turns of the first windings 41, 51 and 61. Other structures are the same as those in the above first embodiment.

In the second embodiment, since the number of turns of the second windings 42, 52 and 62 are larger than the number of turns of the first windings 41, 51 and 61, a voltage developed between the wires becomes large to obtain a larger electromotive force.

Third Embodiment

In a third embodiment, the first windings 41, 51 and 61 are identical in the number of turns with the second windings 42, 52 and 62, and the diameter of the conductor of the second windings 42, 52 and 62 are made larger than the diameter of the conductor of the first windings 41, 51 and 61. Other structures are the same as those in the above first embodiment.

In the third embodiment, since the diameter of the conductor of the second windings 42, 52 and 62 in which a large current flows are made larger, the generation efficiency at the high rotating speed is enhanced.

Fourth Embodiment

Figure 4:
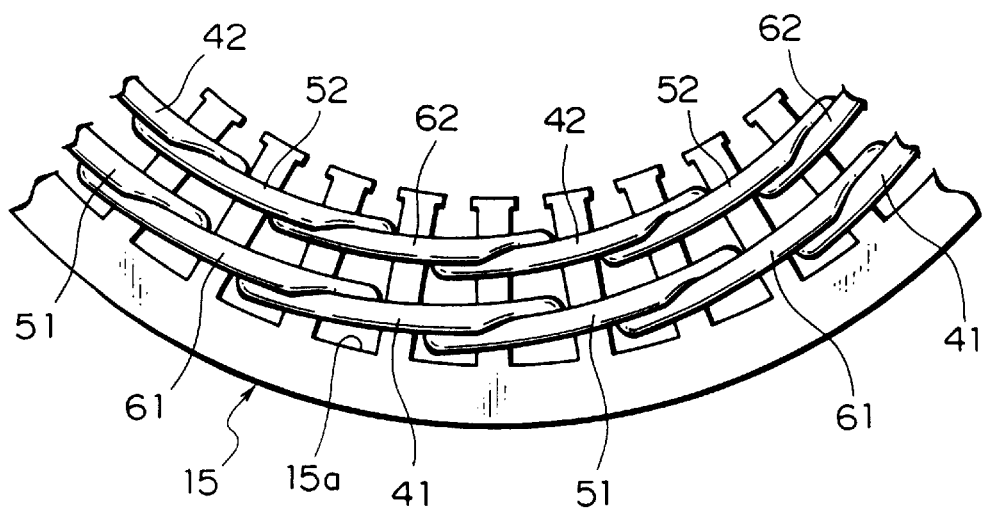
FIG. 4 is a diagram for explanation of the structure of a stator winding in a stator of an a.c. generator for a vehicle in accordance with a fourth embodiment of the present invention.
Figure 5:
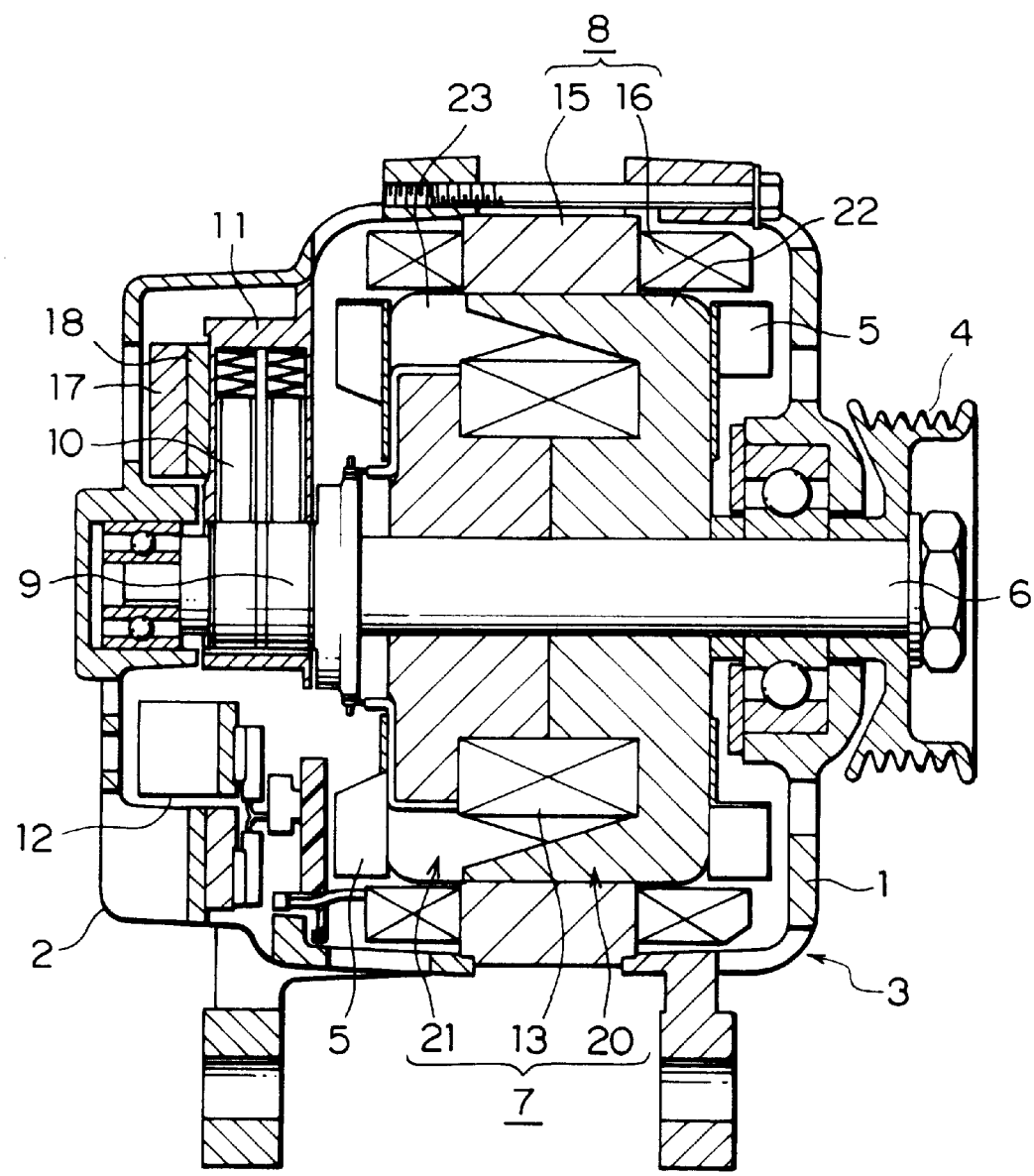
FIG. 5 is a cross-sectional view showing a general a.c. generator for a vehicle.
Figure 6:
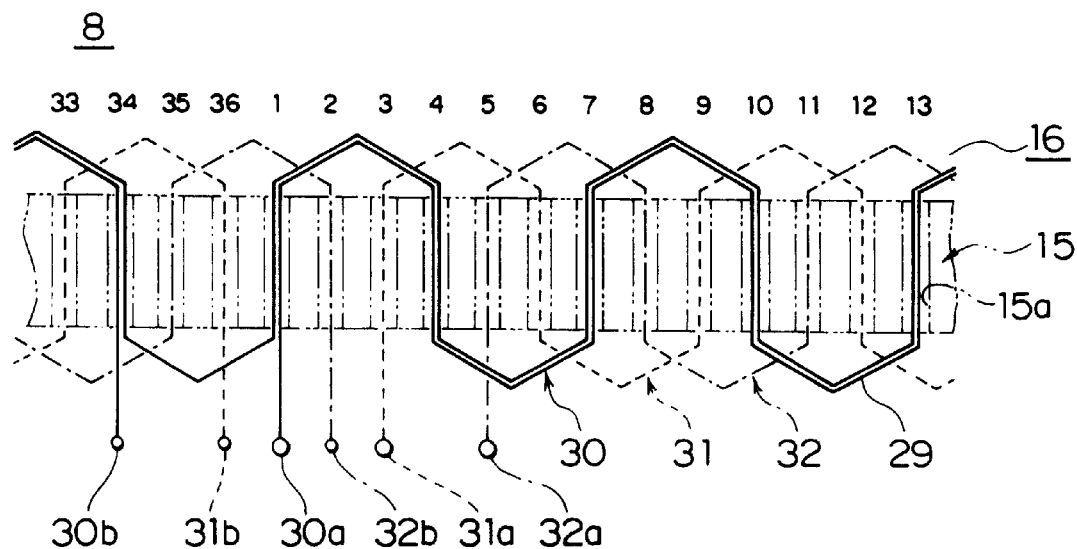
FIG. 6 is a development diagram for explanation of the structure of a stator winding in a stator in a conventional a.c. generator for a vehicle.
Figure 7:
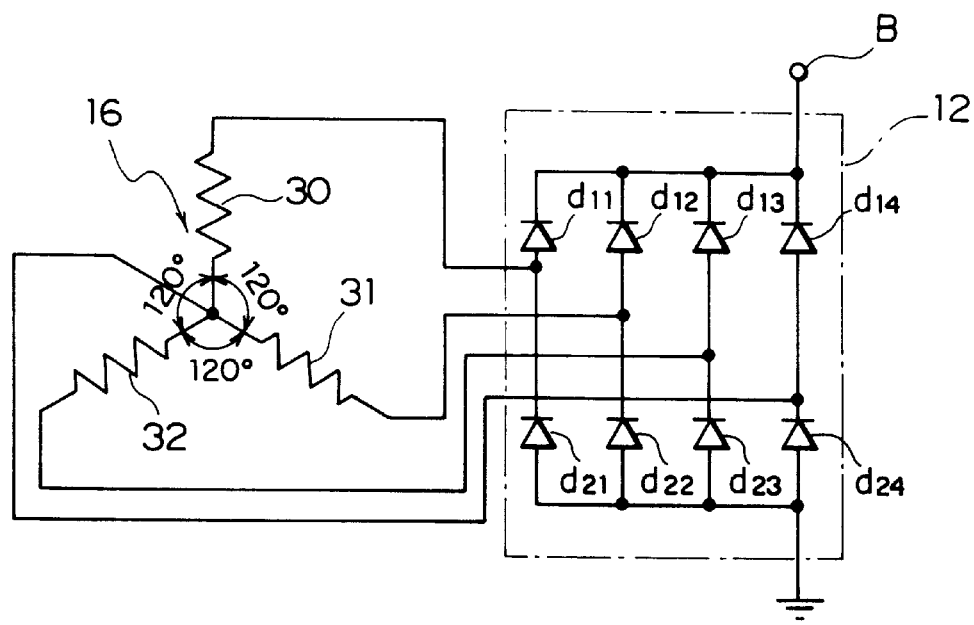
FIG. 7 is a diagram showing an electric connection of a stator winding in the conventional a.c. generator for a vehicle.

In a fourth embodiment, as shown in FIG. 4, the first windings 41, 51 and 61 are wound on the stator core so as to be received in respective slots 15a on the deeper side relative to the slot depth direction (the outer peripheral side in the radial direction), and the second windings 42, 52 and 62 are wound on the stator core so as to be received in respective slots 15a on the shallower side relative to the slot depth direction (the inner peripheral side in the radial direction). Other structures are the same as those in the above first embodiment.

In the fourth embodiment, the first windings 41, 51 and 61 are wound on the stator core so as to be received in respective slots 15a on the deeper side relative to the slot depth direction, that is, on a bottom side of the respective slots 15a. On the other hand, the second windings 42, 52 and 62 are wound on the stator core so as to be received in respective slots 15a on the shallower side relative to the slot depth direction, that is, on an opening side of the respective slots 15a. Accordingly, since a leak inductance of the first windings 41, 51 and 61 received on the bottom side of the respective slots 15a is large, the current is concentrated on the second windings 42, 52 and 62 which are received on the opening side of the respective slots 15a when the rotating speed is high, a characteristic close to a single-phase full-wave rectification is obtained, thereby being capable of increasing the amount of generation.

The above respective embodiments are described in a case where the number of magnetic poles of the rotors 7 is 12 and the number of slots of the stator cores 15 is 36, that is, the number of slots for each pole and for each phase is 1. However, the present invention is not limited to those embodiments. It is needless to say that the present invention can be applied to a case in which the number of slots for each pole and for each phase is 2 or more.

In the above respective embodiments, the second windings 42, 52 and 62 are so structured as to have a phase difference of 120° in electrical angle with respect to the first windings 41, 51 and 61. Then, in the case where the number of slots for each pole and for each phase is 1, the phase difference in electrical angle between the second windings 42, 52 and 62 and the first windings 41, 51 and 61 can be set to 60°, 120° and 180°. For example, in the case where the phase difference in electrical angle between the second windings 42, 52 and 62 and the first windings 41, 51 and 61 is set to 60°, the electromotive force can be made larger as compared with the case where the phase difference in electrical angle between both windings is set to 120°, but no current flows and an output is lowered when the rotating speed is high. Therefore, when the generation start rotating speed and the output at the high speed are totally judged, if the number of slots for each pole and for each phase is 1, it is desirable that the phase difference in electrical angle between the second windings 42, 52 and 62 and the first windings 41, 51 and 61 is set to 120°.

With the above structure, the present invention has advantages stated below.

According to the present invention, there is provided an a.c. generator for a vehicle, including: a rotor rotatably supported within a case; and a stator having a cylindrical stator core in which a plurality of slots are formed at given intervals circumferentially so as to open toward the inner peripheral side thereof and three single-phase windings wound on the stator core and connected in Y connection, the stator being fitted onto the case so as to surround the rotor, wherein each of the single-phase windings includes a first winding which is connected in the Y connection and a second winding which is connected in series to the first winding and has a given phase difference in electrical angle with respect to the first winding, and wherein a connecting portion of the first winding and the second winding constituting each of the single-phase windings is connected to a pair of three-phase diode bridges, and an end portion of the second winding constituting each of the single-phase windings is connected to another pair of three-phase diode bridges. With the above structure, there can be the a.c. generator for a vehicle in which the voltage developed between the wires is raised so that the generation start rotating speed can be lowered, and the generation current at the high rotating speed augments so that the amount of generation can be increased.

Also, since the first windings and the second windings constituting each of the single-phase windings are so structured as to have a phase difference of 120° in electrical angle, a voltage twice as high as a single-phase induced voltage can be developed between the wires.

Further, since the neutral point of the above first windings connected in to the Y connection is connected to the diode bridge, a large number of current paths are formed, and the first windings act as if serial and parallel connection is changed over, thereby being capable of increasing the output current.

Still further, in each of the single-phase windings, since the number of turns of the second windings are larger than the number of turns of the first windings, the voltage developed between the wires becomes large, to thereby obtain a larger electromotive force.

Yet still further, in each of the single-phase windings, since the diameter of a conductor of the second windings are larger than the diameter of a conductor of the first windings, the generation efficiency at the high rotating speed is enhanced.

Yet still further, in each of the single-phase windings, since the first windings are wound on the stator core so that the first windings are located on a deeper side relative to the slot depth direction within the slots, and the second windings are wound on the stator core so that the second windings are located on a shallower side relative to the slot depth direction within the slots, the current is concentrated on the second windings at the high rotating speed, and a characteristic close to a single-phase full-wave rectification is obtained, thereby being capable of increasing the amount of generation.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An a.c. generator for a vehicle, comprising:
   a rotor rotatably supported within a case; and
   a stator comprising a cylindrical stator core in which a plurality of slots are formed at given intervals circumferentially so as to open toward the inner peripheral side thereof and a stator winding constructed by connecting three single-phase windings wound on said stator core into a Y connection, said stator being fitted onto said case so as to surround said rotor, wherein each of said single-phase windings comprises a first winding which is connected into the Y connection and a second winding which is connected in series to said first winding and has a given phase difference in electrical angle with respect to said first winding, and wherein a connecting portion of said first winding and said second winding constituting each of said single-phase windings is connected to a pair of three-phase diode bridges, and an end portion of said second winding of each of said single-phase windings is connected to another pair of three-phase diode bridges.

2. The a.c. generator for a vehicle as claimed in claim 1, wherein the neutral point of said first windings connected into the Y connection is connected to a diode bridge.

3. The a.c. generator for a vehicle as claimed in claim 1, wherein in each of said single-phase windings, the number of turns of said second windings are larger than the number of turns of said first windings.

4. The a.c. generator for a vehicle as claimed in claim 1, wherein in each of said single-phase windings, the diameter of a conductor of said second windings is larger than the diameter of a conductor of said first windings.

5. The a.c. generator for a vehicle as claimed in claim 1, wherein in each of said single-phase windings, said first windings are wound on said stator core so that said first windings are located on a deeper side relative to the slot depth direction within said slots, and said second windings are wound on said stator core so that said second windings are located on a shallower side relative to the slot depth direction within said slots.

6. The a.c. generator for a vehicle as claimed in claim 1, wherein said first winding and said second winding constituting each of said single-phase windings are so structured as to have a phase difference of 120° in electrical angle.

7. The a.c. generator for a vehicle as claimed in claim 6, wherein the neutral point of said first windings connected into the Y connection is connected to a diode bridge.

8. The a.c. generator for a vehicle as claimed in claim 6, wherein in each of said single-phase windings, the number of turns of said second windings are larger than the number of turns of said first windings.

9. The a.c. generator for a vehicle as claimed in claim 6, wherein in each of said single-phase windings, the diameter of a conductor of said second windings is larger than the diameter of a conductor of said first windings.

10. The a.c. generator for a vehicle as claimed in claim 6, wherein in each of said single-phase windings, said first windings are wound on said stator core so that said first windings are located on a deeper side relative to the slot depth direction within said slots, and said second windings are wound on said stator core so that said second windings are located on a shallower side relative to the slot depth direction within said slots.

* * * * *